(12) United States Patent
Nakamura et al.

(10) Patent No.: US 8,280,852 B2
(45) Date of Patent: Oct. 2, 2012

(54) SYSTEM, METHOD AND STORAGE MEDIUM FOR CONTROLLING A PROCESSING SYSTEM

(75) Inventors: Hiroshi Nakamura, Yamanashi (JP); Shouichi Otake, Yamanashi (JP); Wataru Nakagomi, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 689 days.

(21) Appl. No.: 12/205,161

(22) Filed: Sep. 5, 2008

(65) Prior Publication Data

US 2009/0076640 A1    Mar. 19, 2009

Related U.S. Application Data

(60) Provisional application No. 60/991,823, filed on Dec. 3, 2007.

(30) Foreign Application Priority Data

Sep. 14, 2007    (JP) .................................. 2007-239975

(51) Int. Cl.
*G06F 7/00* (2006.01)
*G06F 17/00* (2006.01)

(52) U.S. Cl. ........................................................ 707/648

(58) Field of Classification Search .................. 707/682, 707/648
See application file for complete search history.

(56) References Cited

U.S. PATENT DOCUMENTS

| | | | | |
|---|---|---|---|---|
| 5,933,630 A | * | 8/1999 | Ballard et al. | 713/1 |
| 7,266,418 B2 | * | 9/2007 | Nakayama et al. | 700/115 |
| 2003/0158795 A1 | * | 8/2003 | Markham et al. | 705/28 |
| 2004/0220688 A1 | * | 11/2004 | Behrisch et al. | 700/96 |
| 2004/0225689 A1 | * | 11/2004 | Dettinger et al. | 707/200 |
| 2005/0138081 A1 | * | 6/2005 | Alshab et al. | 707/200 |
| 2005/0187649 A1 | * | 8/2005 | Funk et al. | 700/121 |
| 2006/0009943 A1 | * | 1/2006 | Keck et al. | 702/122 |
| 2006/0224254 A1 | * | 10/2006 | Rumi et al. | 700/28 |
| 2007/0250546 A1 | * | 10/2007 | Muhlhausser et al. | 707/202 |
| 2008/0071405 A1 | * | 3/2008 | Liu et al. | 700/108 |

FOREIGN PATENT DOCUMENTS

JP    64-26244    1/1989

(Continued)

OTHER PUBLICATIONS

Japanese Office Action issued in Japanese Patent Application No. 2007-239975 mailed Sep. 27, 2011. (with English translation).

*Primary Examiner* — Robert Beausoliel, Jr.
*Assistant Examiner* — Nicholas Allen
(74) *Attorney, Agent, or Firm* — Oblon, Spivak, McClelland, Maier & Neustadt, L.L.P.

(57) ABSTRACT

A processing system 10 applies an etching process on a wafer W in a PM1 or PM2. An EC 200 includes functions of a transfer/process control unit 250, a communication unit 255, a log management unit 260, and a backup unit 265, and controls the processing system 10. The transfer/process control unit 250 controls wafer transfer and the etching process. The communication unit 255 transmits to or receives data from each MC 300 and the like. The log management unit 260 registers log information generated at times of the wafer process and transfer, data communication, and the like in log files (in predetermined storage areas of an HDD 215). The backup unit 265 collectively saves the log information stored in the log files in backup files (in other storage areas of the HDD 215), in response to a timing when an unexpected alarm has been generated.

20 Claims, 14 Drawing Sheets

FOREIGN PATENT DOCUMENTS

| | | |
|---|---|---|
| JP | 11-161522 | 6/1999 |
| JP | 11-288990 | 10/1999 |
| JP | 2002-252263 | 9/2002 |
| JP | 2003-22116 | 1/2003 |
| JP | 2003-280899 | 10/2003 |
| JP | 2006-277298 | 10/2006 |

* cited by examiner

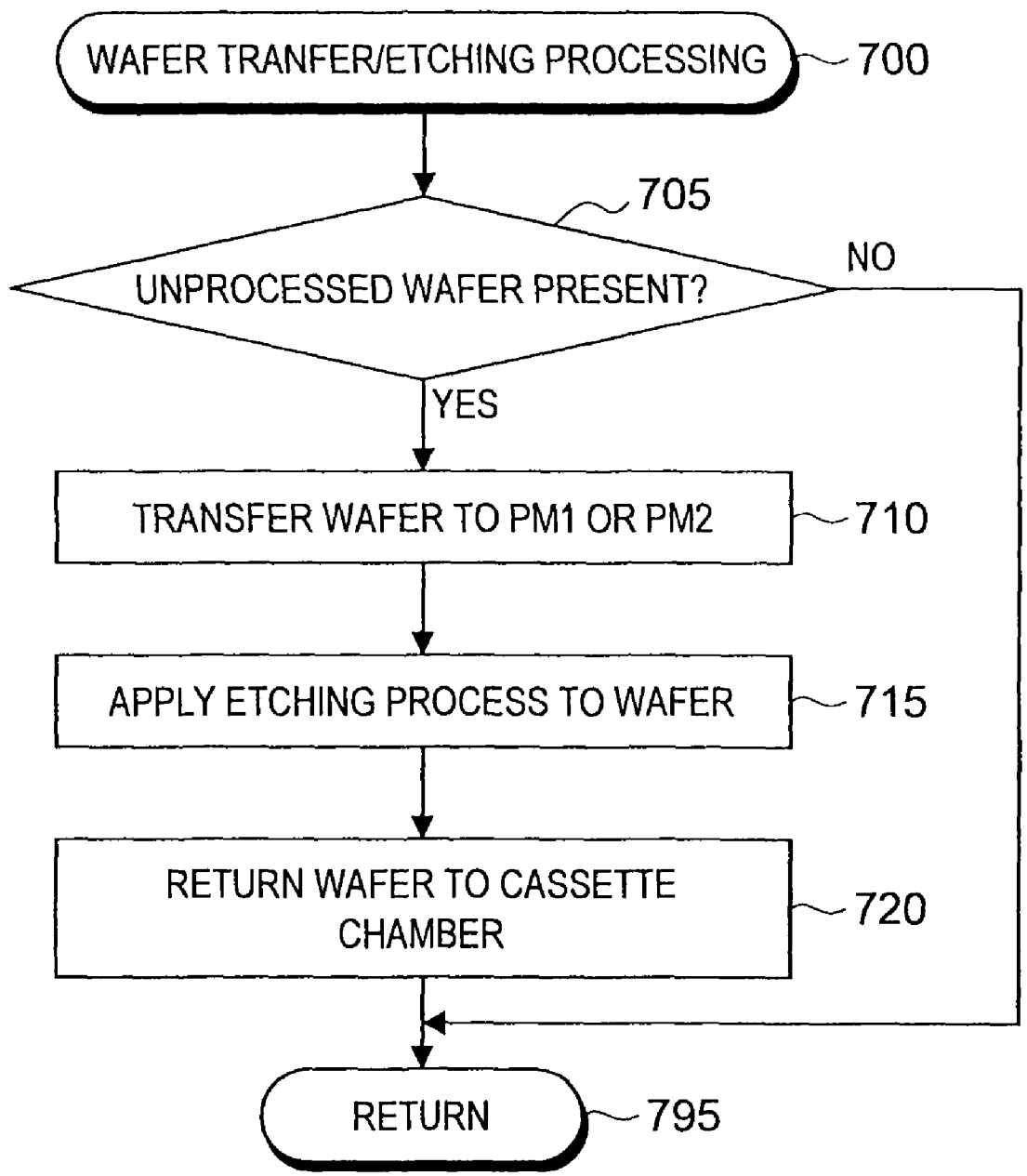

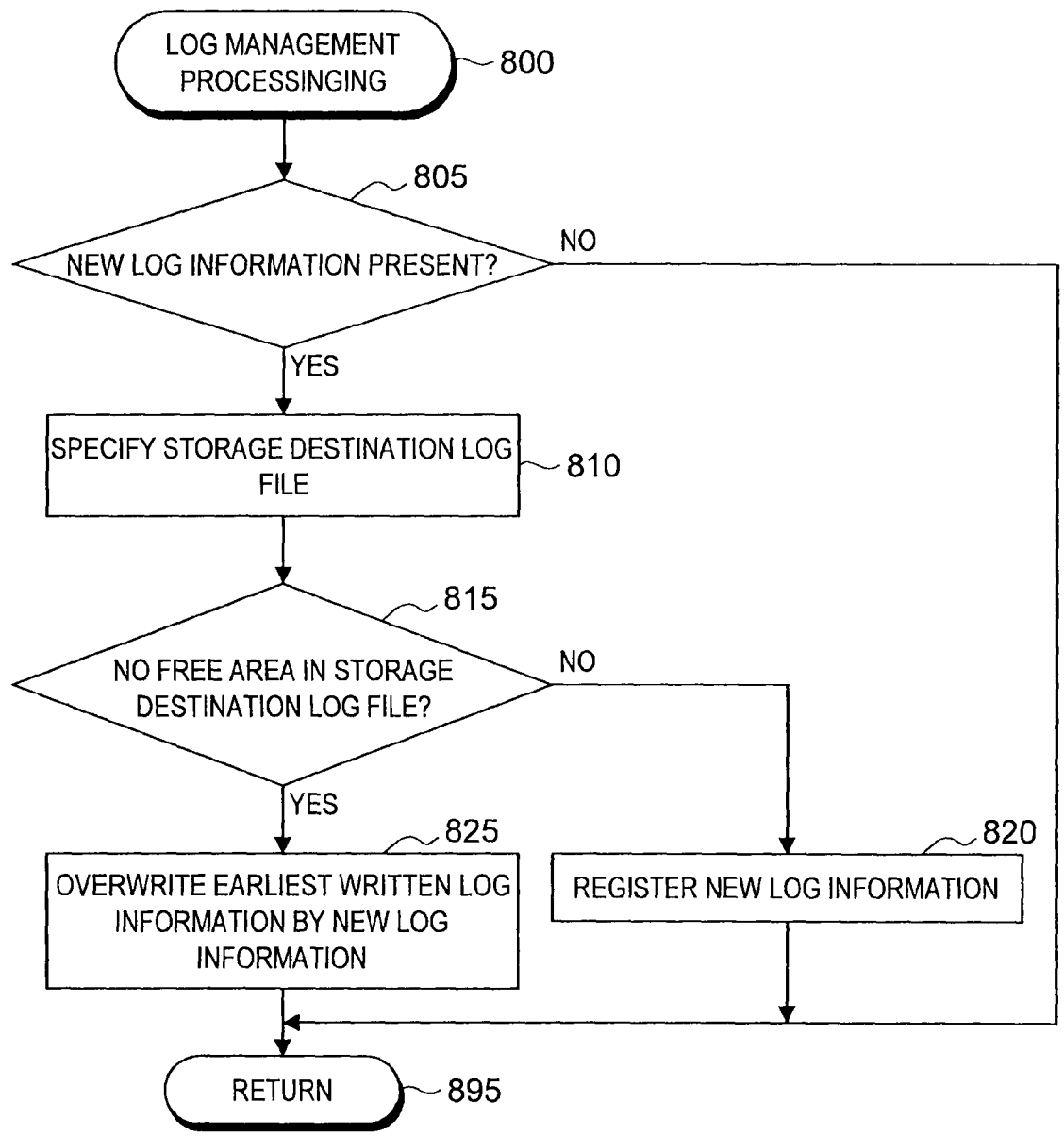

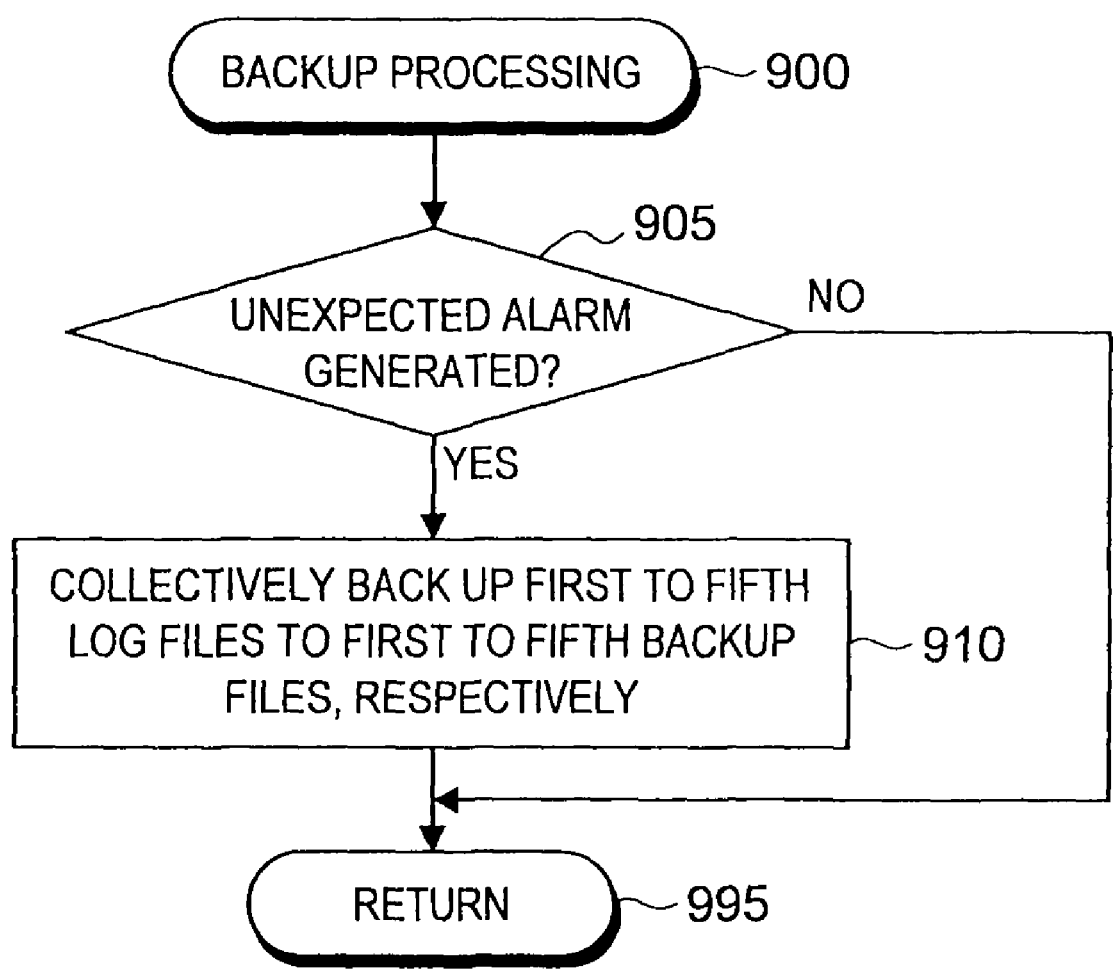

FIG.12

| | BBB | | | | 2007/08/10 |
| --- | --- | --- | --- | --- | --- |
| | MISMATCH OF SYSTEM CONSTANT | | ☀ ▯ | | 14:56:54 |
| DETAILS OF ALARM | IDLE | | | | SCREEN SELECTION |

⏪ ◀ ▶ ⏩

Alarm Message

| Date | Time | |
| --- | --- | --- |
| 7/8/10 | 14:55:15 | MISMATCH OF SYSTEM CONSTANT |

CAUSE AND REMEDY  SYSTEM CONSTANT FOR VERIFYING NG STATE BETWEEN SYSTEM AND
HOSTCOMPUTER HAS BEEN DETECTED.

RECOVERY OPERATION  CONFIRMATION
ERROR MESSAGE WILL BE ERASED.

| | | | LOG SCREEN |
| --- | --- | --- | --- |
| FINISH | CONFIRM | BACKUP | MENU SCREEN |

SYSTEM, METHOD AND STORAGE MEDIUM FOR CONTROLLING A PROCESSING SYSTEM

CROSS-REFERENCE TO RELATED APPLICATION

The present invention contains subject matter related to Japanese Patent Application JP 2007-239975, filed in the Japan Patent Office on Sep. 14, 2007 and Provisional Application No. 60/991,823, filed on Dec. 3, 2007, the entire contents of which being incorporated herein by reference.

FIELD OF THE INVENTION

The present invention relates to a control device and a control method of a processing system that applies a predetermined process to a target object, and a computer-readable storage medium stored a process program. More specifically, the invention relates to a method of managing log information.

BACKGROUND OF THE INVENTION

When a trouble has occurred in one of software and hardware that constitute a processing system during construction of the processing system or during mass production using the processing system, states of the processing system before and after occurrence of the trouble may be desired to be known, in order to track down the cause of the trouble. In this case, log information (history information) serves as a key to know the states of the processing system.

It has been therefore a common practice to store the log information in a predetermined file regularly and find out the cause of the trouble using the stored log information as the key when the trouble has occurred. The related art discloses a method of storing log information when a trouble has occurred in a substrate processing device and then an alarm has been output, as well as storing substrate information when the log information has been generated.

In the related art, the log information of plural types are divided according to the purpose and stored in separate log files. This makes it possible to effectively find out what operation has been performed and how devices of the system have been driven when the trouble has occurred.

SUMMARY OF THE INVENTION

However, when the log information of plural types is separately stored in a plurality of log files, the number of log information that may be stored in each log file is limited because the storage area of the log file is limited. For this reason, when new log information is generated whenever necessary due to continuation of running of the system and then there remains no free area for storage of the new log information in the corresponding log file, it becomes necessary to delete one of the log information already stored in the corresponding log file. Generally, the oldest log information is overwritten by the newest log information. Then, when the overwriting is performed, the oldest log information is automatically erased from the corresponding log file. For this reason, if there is a time difference between the time of storage and the time of extraction of log information, log information necessary for finding out the cause of a trouble may have been deleted from the corresponding log file at the time of extraction of the log information.

A system manager or an operator often determines whether the trouble has arisen due to the same factor as with a known trouble, by utilizing the log information and knowledge obtained so far. Accordingly, unless the log information stored before and after occurrence of the trouble cannot be extracted, it is difficult even for a man skilled in the art to find out the cause of the trouble.

The present invention therefore provides a control device for a processing system, a control method for a processing system, and a computer-readable storage medium stored a process program, with which predetermined log information is collectively backed up at a predetermined timing.

According to an aspect of the present invention, there is provided a control device of a processing system that carries a target object into a processing chamber and applies a predetermined process on the target object in the processing chamber. The control device may include:

a log management unit that stores predetermined events that have occurred in the processing system in a predetermined log file as log information and overwrites one of the stored log information by new log information when a free area of the predetermined log file is insufficient for storage of the new log information; and a backup unit that collectively backs up the log information stored in the predetermined log file in response to a timing when a specific one of the predetermined events has occurred.

The log information stored in the predetermined log file is thus collectively backed up in response to the timing when the specific one of the predetermined events has occurred. With this arrangement, even if the log information stored in the predetermined log file before and after the specific one of the events has occurred has been later overwritten by new log information and lost, the backed-up log information may be used as a substitute of the lost log information. The problem of not being able to obtain the lost log information may be thereby avoided.

This allows the system manager and the operator to utilize the log information generated before and after the timing when the specific one of the events has occurred for analysis of a trouble, with reliability, based on the backed-up log information, irrespective of a state of the log file. The cause of a trouble may be thereby efficiently found out.

According to another aspect of the present invention, there is provided a control method of a processing system that transfers a target object to a processing chamber and applies a predetermined process on the target object in the processing chamber. The control method may include:

storing predetermined events that have occurred in the processing system in a predetermined log file as log information;

overwriting one of the stored log information by new log information when a free area of the predetermined log file is insufficient for storage of the new log information; and collectively backing up the log information stored in the predetermined log file in response to a timing when a specific one of the predetermined events has occurred.

According to other aspect of the present invention, there is provided a storage medium with a process program stored therein, the process program causing a computer to control a processing system that transfers a target object to a processing chamber and applies a predetermined process on the target object in the processing chamber. The process program may include the processes of:

storing predetermined events that have occurred in the processing system in a predetermined log file as log information;

overwriting one of the stored log information by new log information when a free area of the predetermined log file is insufficient for storage of the new log information; and collectively backing up the log information stored in the predetermined log file in response to a timing when a specific one of the predetermined events has occurred.

The log information stored in the predetermined log file is thus collectively backed up in response to the timing when the specific one of the predetermined events has occurred. With this arrangement, even if the log information stored in the predetermined log file before and after the specific one of the events has occurred has been lost, the backed-up log information of the log information generated before and after the timing when the specific one of the events has occurred may be utilized for analysis of a trouble, with reliability. The cause of a trouble may be thereby efficiently found out.

BRIEF DESCRIPTION OF THE DRAWINGS

FIG. 7 is a flowchart showing a wafer transfer/etching processing routine to be executed in the embodiment;

FIG. 8 is a flowchart showing a log management processing routine to be executed in the embodiment;

FIG. 9 is a flowchart showing a backup processing routine in the embodiment;

FIG. 12 shows other example of the alarm display screen;

DESCRIPTION OF THE EMBODIMENT

Figure 1:
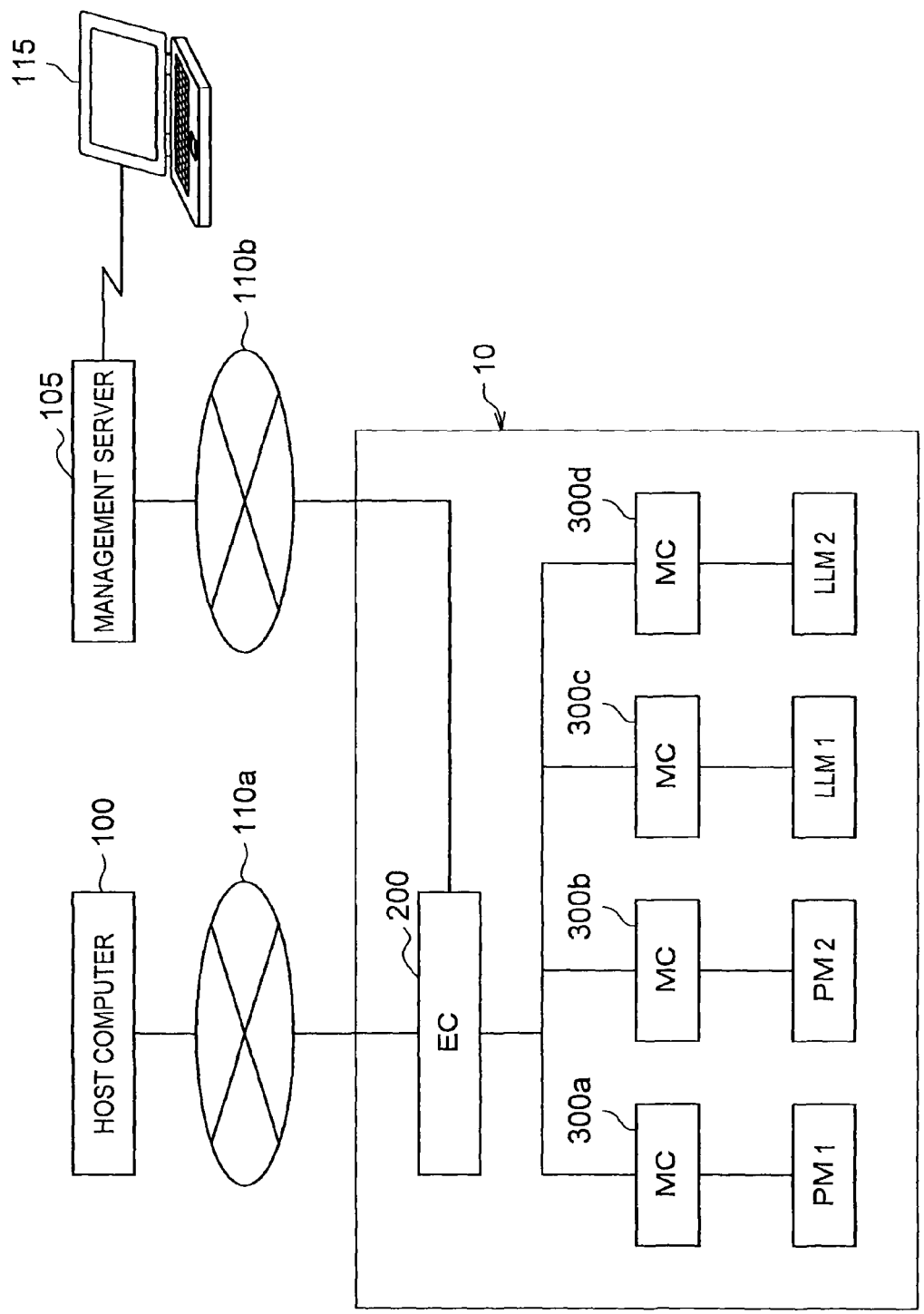
FIG. 1 is a conceptual diagram showing a processing system according to an embodiment of the present invention.

A preferred embodiment of the present invention will be described below in detail, with reference to appended drawings. In the following description and the appended drawings, same reference numerals are assigned to components that have the same configuration and the same function. Repeated description of such components will be thereby omitted.

First, an outline of a processing system according to the embodiment of the present invention will be described with reference to FIG. 1. In this embodiment, the description will be directed to a case where a silicon wafer (hereinafter also referred to as a wafer W) is etched using the processing system.

(Overview of Processing System)

A processing system 10 includes an equipment controller (EC) 200, four machine controllers (MCs) 300a to 300d, two process modules (PMs) PM1 and PM2, and two load lock modules (LLMs) LLM1 and LLM2.

The EC 200 is connected to a host computer 100 through a client-side local area network (LAN) 110a and is also connected to a management server 105 through a client-side LAN 110b. The management server 105 is connected to a personal computer (PC) 115. An operator operates the PC 115, thereby sending a command to the processing system 10. The EC 200, MCs 300a to 300d, PM1, PM2, LLM1, and LLM2 are provided inside a factory and are respectively connected to a LAN inside the factory.

The host computer 100 performs overall management of the processing system 10, such as data management. The EC 200 holds a system recipe that shows a procedure for etching the wafer W, and sends control signals to each of the MCs 300a to 300d so that the PM1, PM2, LLM1, and LLM2 are operated according to the system recipe. The EC 200 also conducts data history management after the operation.

The MCs 300a to 300d holds a process recipe. Based on the control signals transmitted from the EC 200, the MCs 300a and 300b drive respective devices of the PM1 and the PM2, according to the procedure of the process recipe, thereby controlling the process on the wafer W. Further, the MCs 300c and 300d drive respective devices of the LLM1 and the LLM2, thereby controlling transfer of the wafer W.

The PM1 and the PM2 are processing chambers where a predetermined process such as the etching process is applied to the wafer W, each with an inside thereof held in a predetermined vacuum state. The LLM1 and the LLM2 are transfer chambers which transfers the wafer W from the atmosphere side to the corresponding PM on the vacuum side and transfer the wafer W from the corresponding PM on the vacuum side to the atmosphere side, with an inside of each of the LLM1 and LLM2 held in a predetermined reduced pressure state. The management server 105 sets an operating condition of each device based on data transmitted from the PC 115 by the operation of the operator.

(Internal Configuration of Processing System)

Next, an internal configuration of the processing system 10 will be described with reference to FIG. 2. The processing system 10 includes a first process ship PS1, a second process ship PS2, a transfer unit TR, an alignment mechanism AL, and a cassette stage CS.

The first process ship PS1 includes the PM1 and the LLM1. The second process ship PS2 is disposed in parallel with the first process ship PS1, and includes the PM2 and the LLM2. Gate valves V are respectively provided at both ends of each of the LLM1 and LLM2. The LLM1 transfers the wafer W gripped by a transfer arm Arma to the transfer unit TR from the PM1, or from the transfer unit TR to the PM1, with an internal pressure of the LLM1 being adjusted by opening or closing the gate valves V therein. The LIM2 transfer the wafer W gripped by transfer arm Armb to the transfer unit TR from the PM2, or from the transfer unit TR to the PM2 with an internal pressure of the LLM2 being adjusted by opening or closing the gate valves V therein.

The transfer unit TR is a rectangular transfer chamber, and is connected to the first process ship PS1 and the second process ship PS2. A transfer arm Armc is provided at the transfer unit TR. Using the transfer arm Armc, each wafer W is transferred in conjunction with the transfer arm Arma in the LLM1 or the transfer arm Armb in the LLM2.

At one end of the transfer unit TR, the alignment mechanism AL that performs alignment of the wafer W is provided. The alignment of the wafer W is performed by detecting a peripheral portion state of the wafer W by an optical sensor ALb while a turntable ALa with the wafer W placed thereon is rotated.

The cassette stage CS is provided at a side portion of the transfer unit TR. Three cassette chambers C are placed on the cassette stage CS. Each cassette chamber C accommodates a plurality of the wafers W in multiple stages.

With this arrangement, each wafer W in each cassette chamber C is carried out of the cassette chamber C, and is aligned by the alignment mechanism AL via the transfer unit TR. Then, the wafers W are alternately transferred to the process ships PS1 and PS2. Then, each of the wafers W is etched in the PM1 or the PM2 through the LLM1 or the LLM2. Each wafer W is then accommodated in the corresponding cassette chamber C through the LLM1 or the LLM2 and the transfer unit.

The PM1 and the PM2 are an example of a plurality of processing chambers, in each of which a predetermined process is applied to a target object. The cassette stage CS (formed of the cassette chambers C) is an example of a target object accommodating port that accommodates target objects. The transfer unit TR is an example of a transfer mechanism that is disposed between the processing chambers and the target object accommodating port and transfers the target object to a predetermined transfer destination. The EC 200 is an example of a device that controls the processing system 10.

(Hardware Configuration of EC)

Next, a hardware configuration of the EC 200 will be described with reference to FIG. 3. Since a hardware configuration of each MC 300 is the same as that of the EC 200, a description about the hardware configuration of the MC 300 will be herein omitted.

Figure 3:
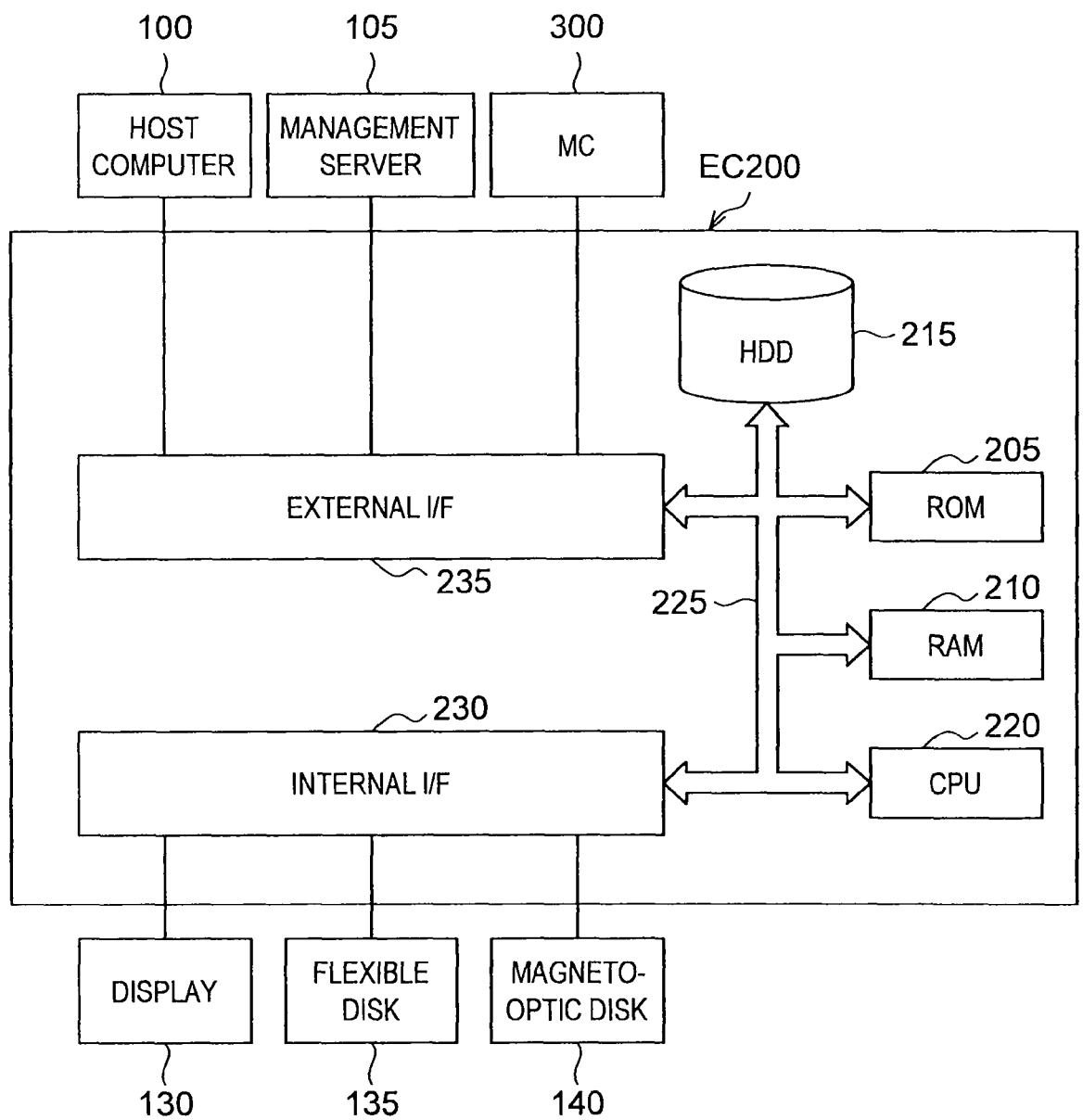
FIG. 3 is a hardware block diagram of an EC in the embodiment.

As shown in FIG. 3, the EC 200 includes a ROM 205, a RAM 210, an HDD 215, a CPU 220, a bus 225, an internal interface (internal I/F) 230, and an external interface (external I/F) 235.

In the ROM 205 and the RAM 210, a program that controls wafer transfer and the wafer process, a program that is activated when an abnormality occurs, various recipes, and various data are stored. Each of the ROM 205 and the RAM 210 is an example of a storage device, and may be replaced by a storage device such as an EEPROM, an optical disk, or a magneto-optic disk.

In the HDD 215, log information on predetermined events that have occurred in the processing system 10 is stored according to type. The CPU 220 controls the wafer transfer and the wafer process according to the various recipes. The bus 225 is a path through which data is exchanged between respective devices of the ROM 205, RAM 210, HDD 215, CPU 220, internal interface 230, and external interface 235.

The internal interface 230 receives data, and then outputs necessary data to a display 130. The internal interface 230 stores predetermined log information in a flexible disk 135 or a magneto-optic disk 140 when desired. The external interface 235 transmits to or receives data from each of the host computer 100, management server 105, and each MC 300.

(Functional Configuration of EC)

Figure 4:
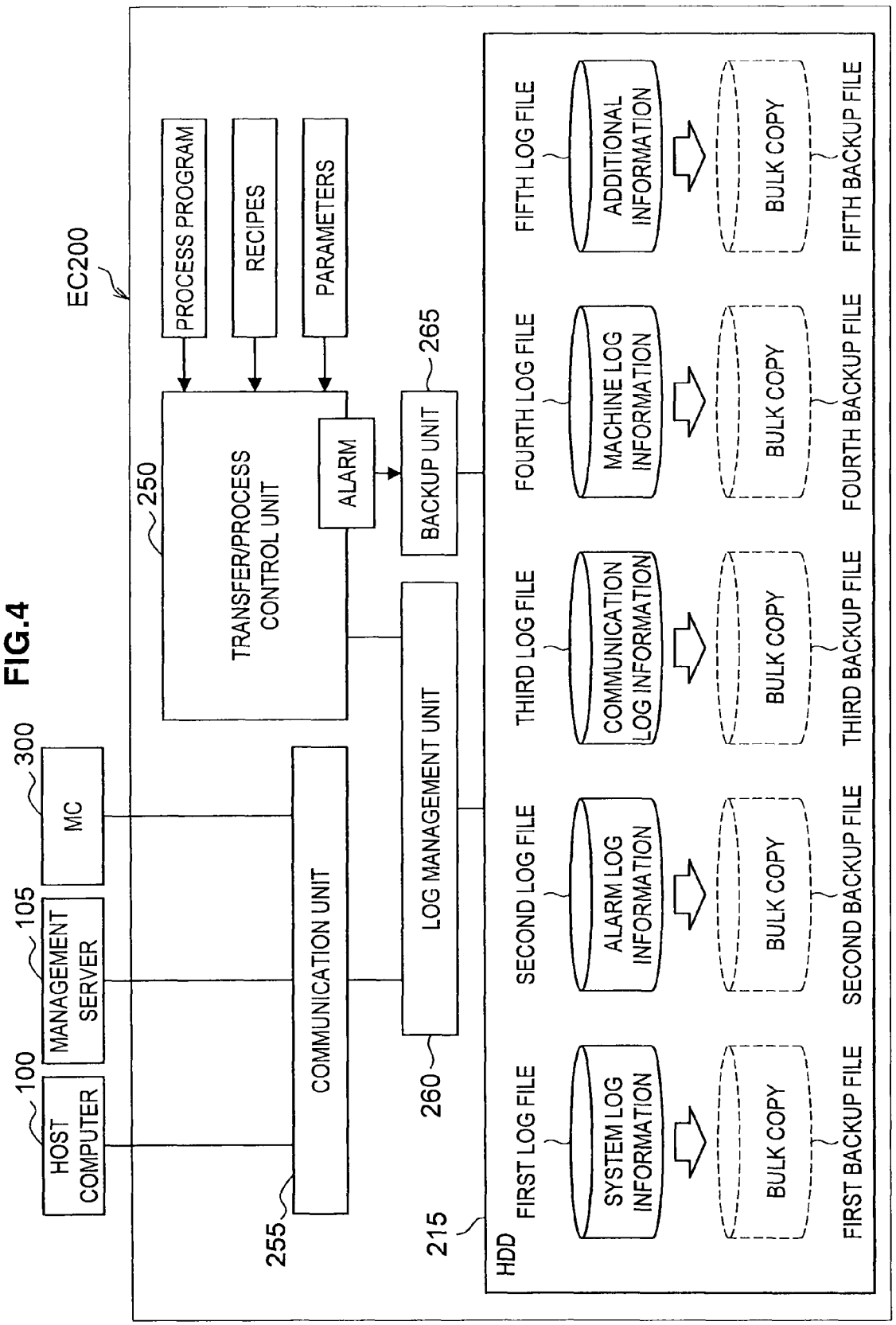
FIG. 4 is a functional block diagram of the EC in the embodiment.

Next, a functional configuration of the EC will be described with reference to FIG. 4 that shows respective functions of the EC by blocks. The EC 200 has the functions shown by the respective blocks of a transfer/process control unit 250, a communication unit 255, a log management unit 260, and a backup unit 265.

Using a recipe and parameters specified by the operator and the process program for the wafer transfer and the wafer process, the transfer/process control unit 250 outputs a signal for transferring each wafer to one of the PM1 and the PM2 and controlling the etching process to be executed in each PM according to the procedure of the recipe.

The communication unit 255 transmits the signal output from the transfer/process control unit 250 to each of the MC 300's and also receives data showing a result of the process of the wafer. The communication unit 255 also communicates with the host computer 100 and the management server 105, as necessary.

The log management unit 260 registers the log information on the predetermined events that have occurred in the processing system 10 in a predetermined log file in the HDD 215. When a free area of the predetermined log file is insufficient for storage of new log information, the log management unit 260 overwrites log information stored earliest by the new log information.

First to fifth log files are provided at the HDD 215. System log information, alarm log information, communication log information, machine log information, and additional information are stored in the first to fifth log files, respectively.

Figure 5:
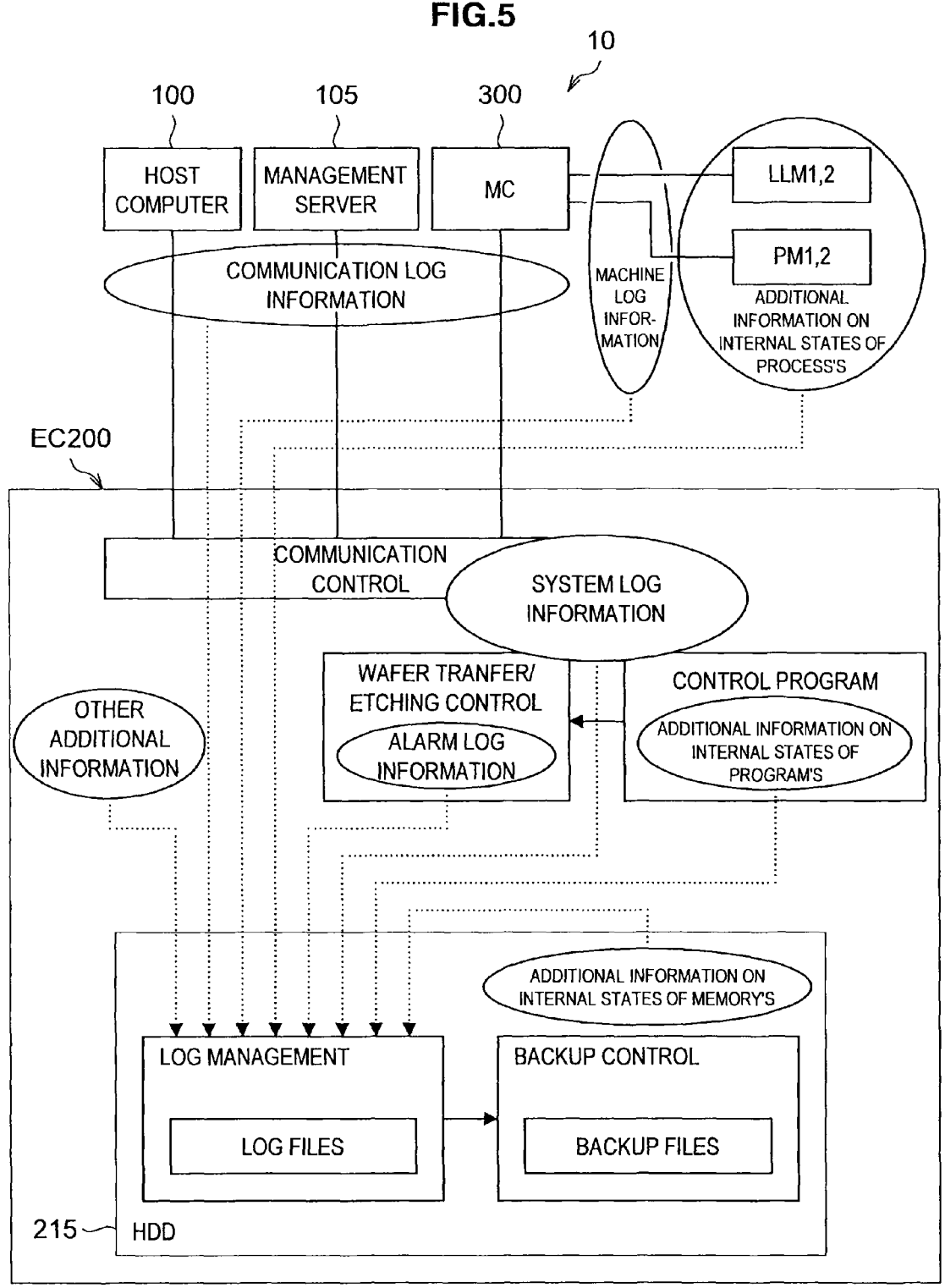
FIG. 5 is a diagram for explaining generating conditions of various log information in the embodiment.

As shown in FIG. 5, the system log information represents a history of events that have occurred in the overall processing system, such as the wafer transfer, etching process, and an abnormality that has occurred in the system.

The alarm log information represents a history of alarms generated in the processing system 10. The alarm log information is generated at a timing when alarm processing included in the process program is executed at a time of execution of the wafer transfer and the etching process using the process program, as shown in FIG. 5.

Figure 6A:
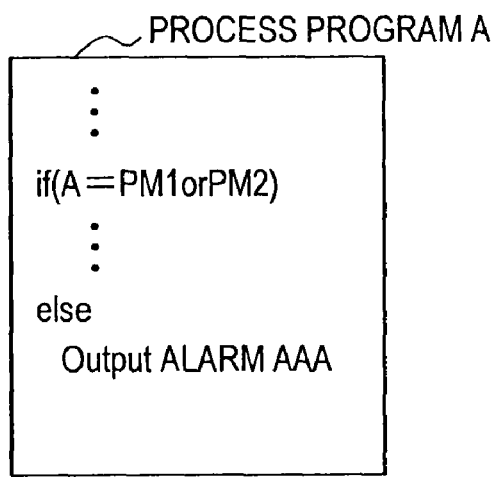
FIG. 6A is a diagram showing an alarm processing step written in a process program to be used in the embodiment.

The alarm log information includes an unexpected alarm that is unlikely to be generated in the processing system 10 in view of the configuration of the system. The unexpected alarm is inserted into a portion of the program that is unlikely to be executed at a time of controlling the processing system 10 using this program. In a process program A shown in FIG. 6A, for example, when a transfer destination A for applying the etching process to the wafer is the PM1 or the PM2, processing steps under an "if" statement are executed. Otherwise, a processing step under an "else" statement, for outputting an alarm AAA to the display 130, is executed. In the processing system 10 in this embodiment, the transfer destination A for applying the etching process to the wafer is either of the PM1 and the PM2. Accordingly, when a jump to the "else" statement is made and the alarm processing step is executed, it means that the unexpected alarm which is unlikely to be generated in view of the system configuration has been generated.

Figure 6B:
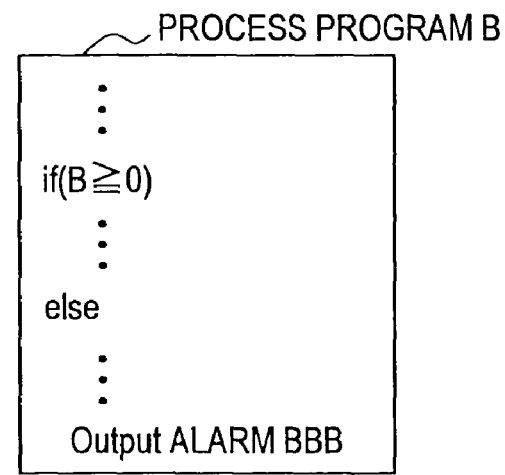
FIG. 6B is a diagram showing an alarm processing step written in a process program to be used in the embodiment.

There is also an alarm that is inserted into the program for controlling the processing system 10 in order to investigate a trouble. In a process program B shown in FIG. 6B, for example, when a value B in a memory is zero or higher, processing steps under an "if" statement are executed. Otherwise (when the value B is less than zero), processing steps under an else statement is executed, and the processing step of outputting an alarm BBB to the display is also executed. In the processing system 10 in this embodiment, the value B being less than zero is set to be exceptional processing though the value B being less than zero may also be expected. By including the alarm processing step in a specific portion of the program as described above, the trouble of the processing system may be efficiently investigated, based on the log information collectively backed up at a timing when the alarm has been generated.

The communication log information shown in FIG. 5 represents a history of events that have occurred at a time of communication between the EC 200 and each of the host computer 100, management server 105, and each MC 300. The machine log information represents a history indicating states of driven portions in the PM 1 and the PM2 and states of driven portions in the LLM1 and the LLM2. As the driven portions in each of the PM 1 and the PM 2, an elevator mechanism for a stage where each wafer is placed, the gate valves that are opened or closed when the wafer is carried into or carried out of the PM1 or PM2 may be pointed out. As the driven portions in the LLM1 and the LLM2, the transfer arms or the like may be pointed out. The system log information, alarm log information, communication log information, and machine log information are respectively saved in the first to fourth log files in the forms of binary files.

The additional information includes information indicating an internal state of the process program, information indicating internal states of the PM1 and the PM2 and the LLM1 and the LLM2 during execution of the process, and information indicating internal states of memories of the HDD 215 when an alarm has been generated. These information indicates instantaneous states of the respective portions of the processing system 10 after the alarm has been generated.

As other additional information, information on a device start log, version information, network setting information, information on a message queue and a disk free area, core file information, detailed transfer information, detailed process information, and pause bit information may be pointed out.

Referring back to FIG. 4 again, the log management unit 260 manages various log information. Specifically, the log management unit 260 stores the system log information in the first log file, stores the alarm log information in the second log file, stores the communication log information in the third log file, and stores the machine log information in the fourth log file respectively. As an additional information log, the log management unit 260 stores in the fifth log file history information indicating the internal state of the process program, the internal states of the memories of the HDD 215, and the internal state of the process when an alarm has been generated.

The storage area of each log file is limited. Thus, when a free area of each log file is insufficient for storage of new log information, the log management unit 260 overwrites the log information stored earliest among the log information stored in each log file by the new log information. With this arrangement, the log information that is least likely to be used among the log information stored in each log file is erased.

The backup unit 265 collectively backs up the log information stored in predetermined log files, in response to a timing when a specific one of the predetermined events has occurred. As an example of the backup timing, generation of the unexpected alarm may be pointed out. When the unexpected alarm has been generated, the backup unit 265 bulk copies the log information in the first to fifth log files to first to fifth backup files in the HDD 215, respectively.

Each of the first to fifth backup files has the same size (memory capacity) as each of the first to fifth log files. The size of each backup file is set such that after backup, the backup file may be readily and promptly copied to the flexible disk 135 or the magneto-optic disk 140 and then log information may be given to the user so as to investigate the trouble.

An alarm type and the corresponding log file to be backed up may be set in advance. Then, at least one of the first to fifth log files may be bulk copied according to the alarm type. With this arrangement, only the log information of a necessary type may be backed up according to the content of the alarm.

The functions of the respective units of the EC 200 described above are actually implemented by the CPU 220 in FIG. 3. The CPU 220 reads out the process program that describes a processing procedure for implementing the functions in detail from storage media of the ROM 205, RAM 210, and HDD 215, and interprets and executes the program. In this embodiment, for example, the respective functions of the transfer/process control unit 250, log management unit 260, and backup unit 265 are actually implemented by execution of the program that describes the processing procedure for implementing these functions by the CPU 220.

(Operation of EC)

Next, the wafer transfer/etching process, log management processing, and backup processing to be executed by the EC 200 will be described with reference to flowcharts shown in FIGS. 7 to 9. Each of the wafer transfer/etching process shown in the flowchart in FIG. 7 and the log management processing shown in the flowchart in FIG. 8 is individually started after each predetermined period of time. The backup processing shown in the flowchart in FIG. 9 is started as interrupt processing when the unexpected alarm has been generated.

(Wafer Transfer/Etching Processing)

When the operator specifies the recipe and a lot number and then turns on a lot start button, the corresponding lot is put in, so that preparation for sequential transfer of wafers included in the lot is completed. In response to the timing of the completion of the preparation, the wafer transfer/etching processing is started from step 700 in FIG. 7. The transfer/process control unit 250 determines whether there is an unprocessed wafer or not, in step 705. When it has been determined that there is the unprocessed wafer at this point, the transfer/process control unit 250 outputs a signal for transferring the unprocessed wafer to the transfer destination (PM1 or PM2) in step 710. This instruction signal is transferred from the communication unit 255 to the MCs 300. By control of the MCs 300, the transfer mechanism for the corresponding one of the PM1 and the PM2 is driven. Transfer of the wafer is thereby started.

Next, in step 715, the transfer/process control unit 250 controls so that the etching process is applied to the wafer. After completion of the process, the transfer/process control unit 250 controls so that the processed wafer is accommodated in the corresponding cassette chamber again, in step 720. Then, in step 795, the wafer transfer/etching process is temporarily finished. When it has been determined in step 705 that there is no unprocessed wafer, the operation immediately proceeds to step 795, and the wafer transfer/etching process is temporarily finished.

During execution of the process, plural types of log information are generated. When the operator turns on the lot start button, for example, the system log information is generated. When the signal for transferring the wafer to the transfer destination is transmitted to the MCs 300 from the communication unit 255, the communication log information is generated. When drive devices for each PM are driven by control of the MCs 300 based on this signal, the machine log information is generated.

(Log Management Processing)

Next, log management processing will be described. In the log management processing, each event that has occurred according to the running state of the processing system is managed as log information, as described above. The log management processing is started from step 800 in FIG. 8. In step 805, the log management unit 260 determines whether new log information is generated or not. When it has been determined that the new log information is generated, the log management unit 260 specifies the log file where the generated log information is to be stored according to the type of the generated log information, in step 810. For the system log information, for example, the first log file is specified.

Then, in step 815, the log management unit 260 determines whether there is a free area in the specified log file. When each log file can store 8000 pieces of log information, for example, the 8000 pieces of log information are stored without being overwritten. Up to this stage, the log management unit 260 determines that there is the free area in the specified log file, and the operation proceeds to step 820. In step 820, the log management unit 260 registers the new log information in the specified log file.

Figure 10:
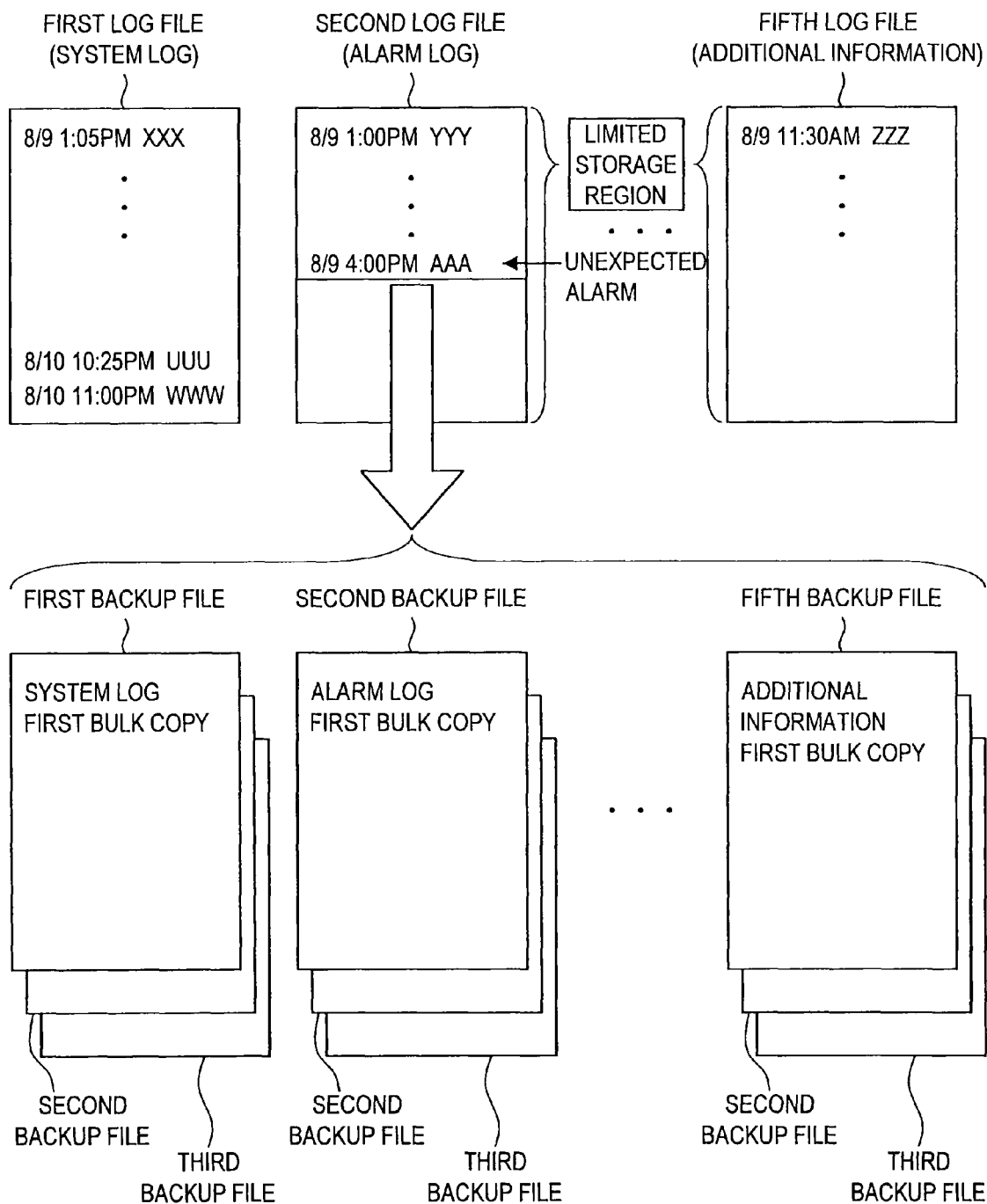
FIG. 10 is a diagram for explaining the relationship between log files and backup files and a backup timing.

When the operator turns on the lot start button, for example, a date and a time "8/9 1:05 PM" and content of the event "XXX (lot start)", for example, are registered in the first log file that stores the system log information in FIG. 10, as the generated system log information.

Then, events related to the processing system are registered in the first log file and other log files, one after another. When log information of "8/10 11:00 PM WWW" is registered in the first log file, there remains no free area in the first log file. At this point, the log management unit 260 determines that there remains no free area in the storage destination log file in step 815. Then, in step 825, the log management unit 260 overwrites the earliest written log information of "8/9 1:05 PM XXX" by newly generated log information. Then, the operation proceeds to the step 895, and the processing is temporarily finished.

As described above, when each log file is filled with log information, the oldest log information is deleted. In this situation, if there is a time difference between the time of storage and the time of extraction of log information, log information necessary for finding out the cause of a trouble may have been already deleted and may not be able to be used.

Then, in order to prevent this phenomenon, in the processing system 10 in this embodiment, log information stored in the log files are collectively backed up at a desired timing. A description will be directed below to processing for the backup, with reference to the flowchart in FIG. 9.

(Backup Processing)

The backup processing is started from step 900. In step 905, the backup unit 265 determines whether the unexpected alarm has occurred or not. When it is determined that the unexpected alarm AAA in FIG. 6A has occurred, the log management unit 260 newly registers log information on an event of the unexpected alarm, which is "8/9 4:00 PM AAA", in the second log file (that stores the alarm log information), as shown in the second log file in FIG. 10.

Then, in step 910, the backup unit 265 collectively backs up the first to fifth log files to the first to fifth backup files, respectively. Then the operation proceeds to step 995, so that the processing is temporarily finished. When it is determined that the unexpected alarm has not been generated, the operation immediately proceeds to step 995 from step 905, so that the processing is finished. As described above, whenever the unexpected alarm has been generated, the first to fifth backup files of the same size shown in FIG. 10 are generated. The number of the backup files that may be held is limited due to limitation of the usage region of the HDD 215. For this reason, when the number of the backup files reaches maximum, the content of the oldest backup file is overwritten by the content of a new backup file. At this point, the oldest backup file is erased.

As described above, according to the processing system 10 in this embodiment, log information stored at timings before and after occurrence of the unexpected alarm is backed up. This allows a system manager or the operator to acquire necessary log information from the backup files with reliability, irrespective of states of the log files. As a result, even if new log information is generated whenever necessary due to continuation of running of the processing system and log information necessary for finding out the cause of a trouble is deleted due to overwriting by the new log information, the log information necessary for finding out the cause of the trouble remains in the backup files. By using these log information, the cause of the unexpected alarm may be investigated.

The backup unit 265 stores in the fifth log file the additional information indicating the internal state of the process program, the internal states of the memories of the HDD 215, and the internal state of the process when an alarm has been generated. Accordingly, predetermined additional information as well as log information indicating predetermined events may be utilized for analyzing a trouble. With this arrangement, a burden of examining the cause of the alarm may be more reduced.

Each log information includes at least a time when each event has occurred. In addition to this time information, each log information may also include information on the wafer being processed at the time when each event has occurred.

The backup unit 265 may rearrange the log information that have been collectively backed up, using keywords extracted from the content of processing of the unexpected alarm, and then may bulk copy the rearranged log information to the backup files. Alternatively, the backup unit 265 may bulk copy the log information to the backup files and then may rearrange the log information in the backup files using the keywords extracted from the content of the processing of the unexpected alarm. With this arrangement, it becomes possible to readily investigate when and what processing has been executed before and after the timing when the unexpected alarm has been generated. The log information which has been collectively backed up may be analyzed and then may be rearranged in a time series for each keyword.

The overall capacity of the log files and the overall capacity of the backup files are each set to a capacity, which is equivalent to the capacity of one arbitrary storage medium or which may be transmitted by one e-mail, assuming that backed-up log information is promptly and readily given to the log information user. More specifically, the log information that has been collectively backed up when the unexpected alarm has been generated is stored in the storage medium such as the flexible disk or the magneto-optic disk, or is transmitted by being attached to the one e-mail. In order to do so, the overall capacity of the log files and the overall capacity of the backup files are each set to the size that allows prompt and reliable transmission of data to personnel who need the log information so as to take measures against a trouble. For this reason, the overall capacity of the log files and the overall capacity of the backup files should not be set to be large.

Figure 11:
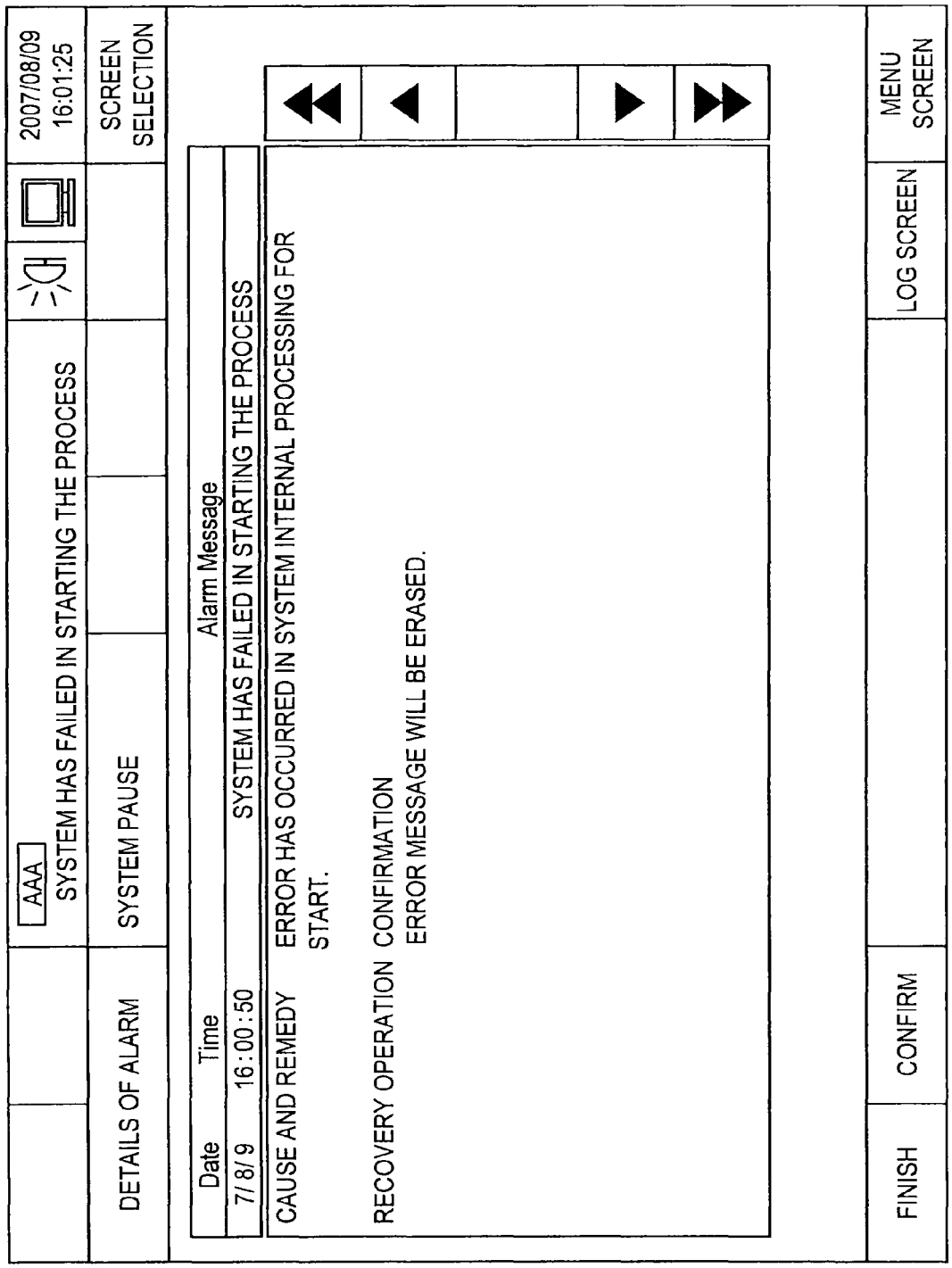
FIG. 11 shows an example of an alarm display screen.

A predetermined alarm is displayed on the display 130 as shown in FIG. 11 or FIG. 12. Referring to FIG. 11, the operator may only depress a confirm button or may only depress a finish button for finishing the processing on the screen of the display 130. The backup processing shown in FIG. 9 does not work together with the operation by the operator. It means that the backup unit 265 automatically backs up log information in response to a timing when the unexpected alarm unlikely to be generated in the processing system 10 in view of the system configuration has been generated.

The operation by the operator and the backup processing may be set to work together. In that case, a screen shown in FIG. 12 is displayed on the display 130. The backup processing is started in response to a timing when the operator has depressed a backup button on the screen. As described above, the backup unit 265 may back up log information in response to the timing when the unexpected alarm not likely to be generated in the processing system 10 has been generated and the operation for the backup for the unexpected alarm has also been performed by the operator.

In this manner, the log information is collectively backed up only after the unexpected alarm has been generated in the processing system 10 and the operator has sent a signal that he or she desires to back up the log information. With this arrangement, unnecessary backup may be prevented, and needless consumption of the storage area of the HDD 215 may be prevented.

VARIATION EXAMPLES OF PROCESSING SYSTEM

The processing system 10 may be the system of a cluster type including a plurality of the PMs each of which applies a predetermined process on the wafer, cassette chambers that accommodate the wafers, and a transfer mechanism disposed between the PMs and the cassette chambers. The transfer mechanism transfers the wafer to a predetermined transfer destination.

First Variation Example

Figure 13:
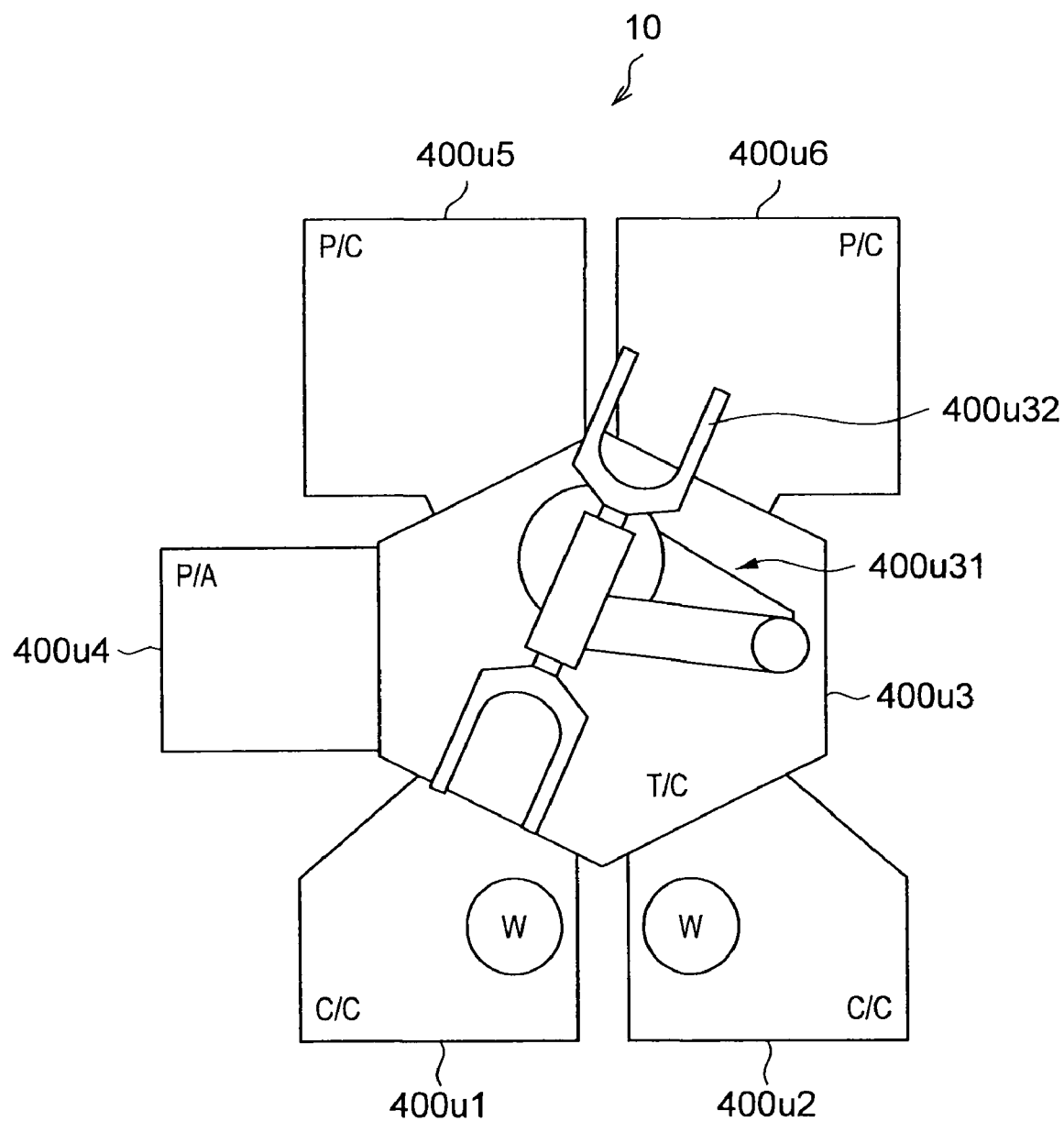
FIG. 13 is a diagram showing other internal configuration of the processing system.

The processing system 10 in a first variation example may have a configuration shown in FIG. 13, for example. The processing system 10 includes cassette chambers (C/Cs) 400$u$1 and 400$u$2, a transfer chamber (T/C) 400$u$3, a pre-alignment (P/A) 400$u$4, and process chambers (P/Cs) 400$u$5 and 400$u$6, which are the PMs.

Unprocessed and processed wafers are accommodated in the C/Cs 400$u$1 and 400$u$2. The P/A 400$u$4 performs alignment of the wafer W. A bendable, revolvable, multi-joint arm 400$u$31 is provided at the T/C 400$u$3. The arm 400$u$31 holds the wafer on a fork 400$u$32 attached to the end thereof, and transfers the wafer between each of the C/Cs 400$u$1 and 400$u$2 and a corresponding one of the P/Cs 400$u$5 and 400$u$6 through the P/A 400$u$4 while bending and revolving as necessary.

With this arrangement, the processing system 10 in the first variation example carries the wafer W out of the C/C 400$u$1 or 400$u$2 using the arm 400$u$31 of the T/C 400$u$3 and carries the wafer W into the P/C 400$u$5 or 400$u$6 through the T/C 400$u$3 and the P/A 400$u$4. Then, the processing system 10 applies a process such as the etching process to the wafer W, and then returns the processed wafer W to the C/C 400$u$1 or 400$u$2 again through the T/C 400$u$3.

Second Variation Example

Figure 14:
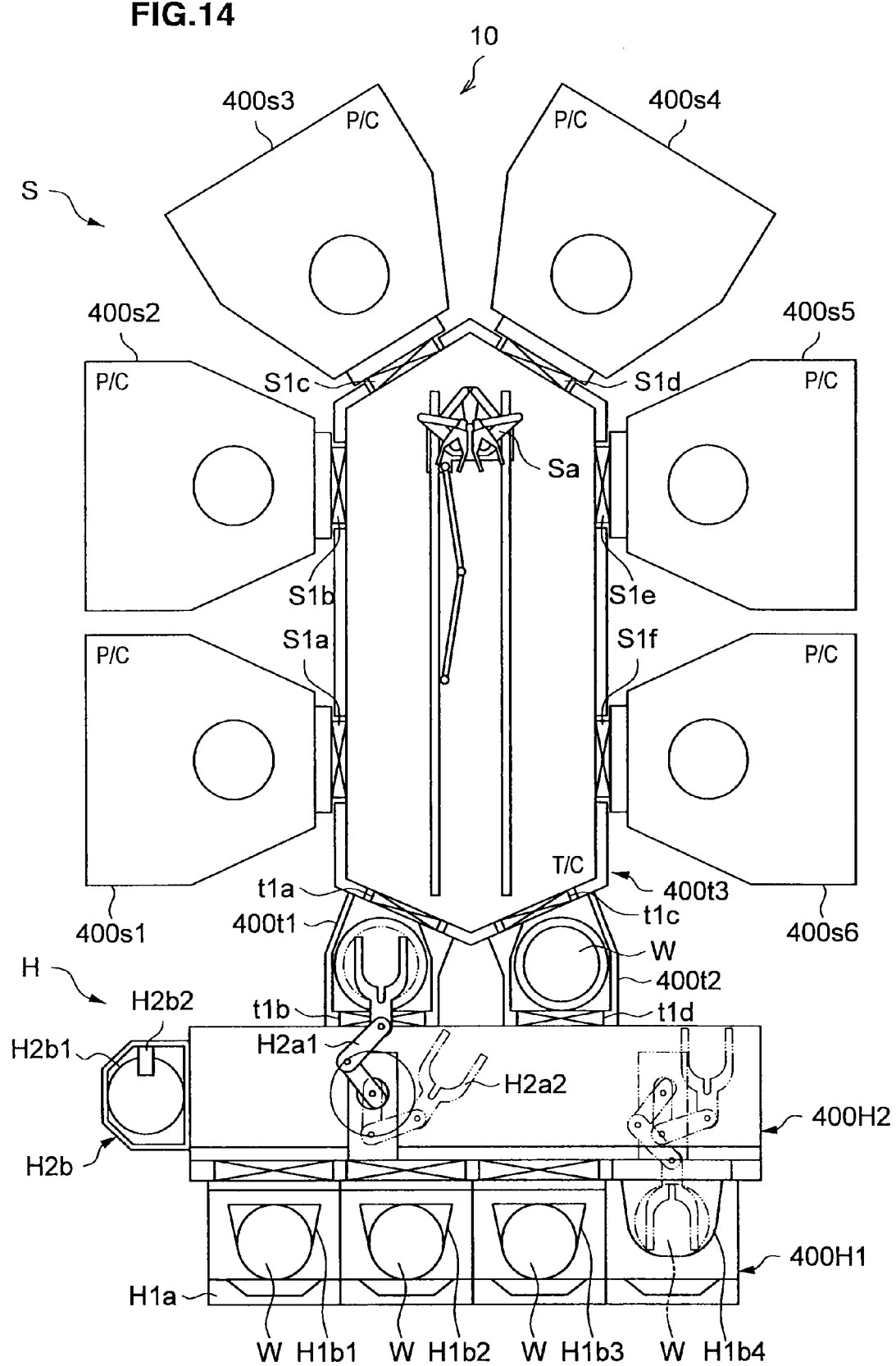
FIG. 14 is a diagram showing other internal configuration of the processing system.

The processing system 10 in a second variation example may have a configuration shown in FIG. 14. The processing system 10 includes a transfer system H that transfers the wafer W and a process system S that performs a process such as a deposition process or the etching process on the wafer W. The transfer system H and the process system S are coupled through LLMs 400$t$1 and 400$t$2.

The transfer system H includes a cassette stage 400H1 and a transfer stage 400H2. On the cassette stage 400H1, a chamber placement table H1$a$ is provided. On the chamber placement table H1$a$, four cassette chambers H1$b$1 to H1$b$4 are placed. Each cassette chamber H1$b$ accommodates the wafers W in multiple stages.

Two bendable and revolvable transfer arms H2$a$1 and H2$a$2 are supported on the transfer stage 400H2 so that the transfer arms H2$a$1 and H2$a$2 are slid by magnetic driving. Each of the transfer arms H2$a$1 and H2$a$2 holds the wafer W on a fork attached to the end thereof.

At an end portion of the transfer stage 400H2, an alignment mechanism H2$b$ that performs alignment of the wafer W is provided. The alignment of the wafer W is performed by detecting a peripheral portion state of the wafer W by an optical sensor H2$b$2 while a turntable H2$b$1 with the wafer W placed thereon is rotated.

Each of the LLMs 400$t$1 and 400$t$2 includes in an inside thereof a placement table for placing the wafer W. At both ends of the LLM 400$t$1, gate valves t1$a$ and t1$b$ are provided. At both ends of the LLM 400$t$2, gate valves t1$c$ and t1$d$ are provided. With this arrangement, the transfer system H transfers the wafer W between each of the cassette chambers H1$b$1 to H1$b$4 and the LLM 400$t$1 and 400$t$2 through the alignment mechanism H2$b$.

Figure 2:
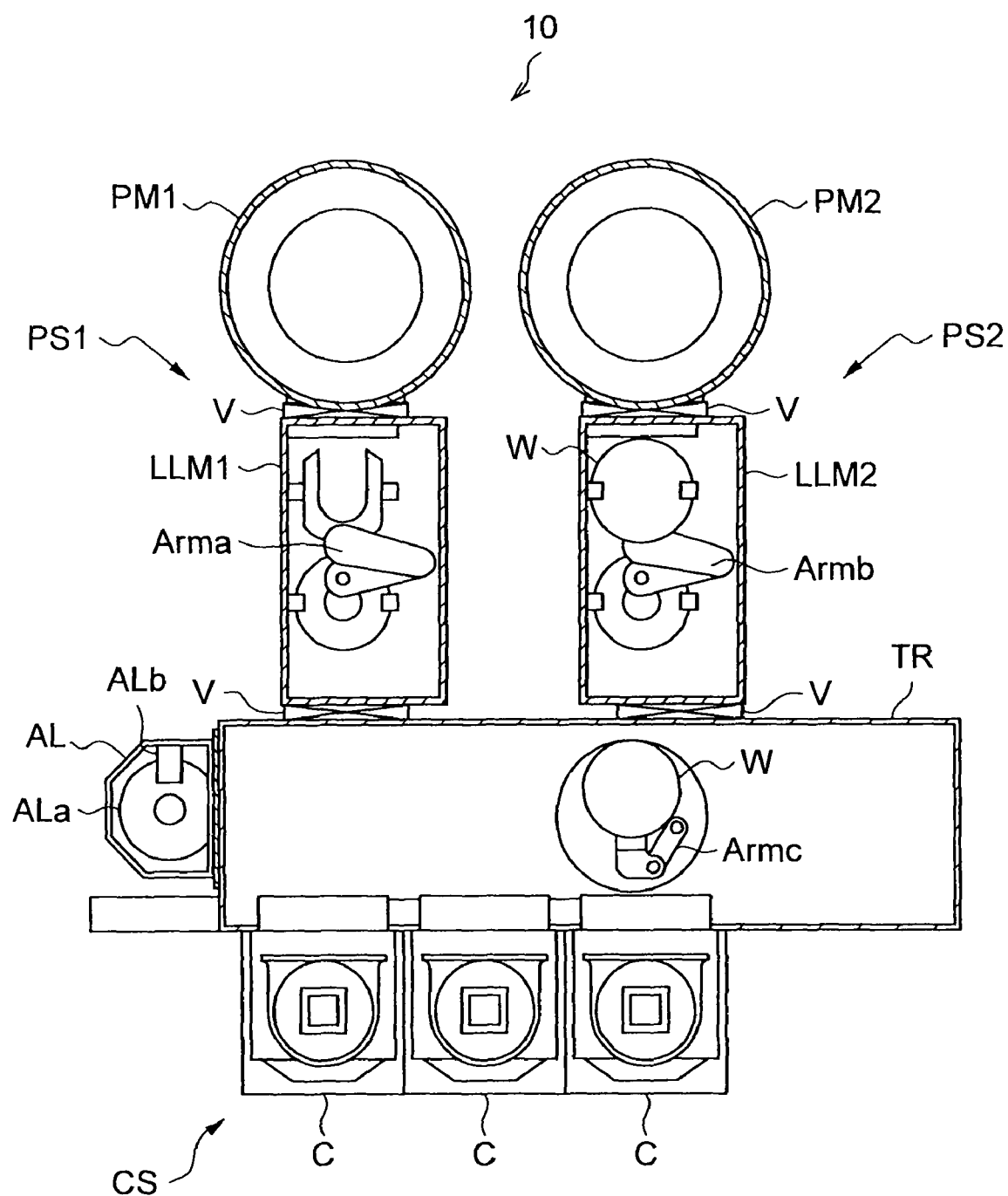
FIG. 2 is a diagram showing an internal configuration of the processing system in the embodiment.

The processing system S includes a transfer chamber (T/C) 400$t$3, which corresponds to the TR in FIG. 2 and six process chambers (P/Cs) 400$s$1 to 400$s$6, which correspond to the PMs. The transfer chamber T/C 400$t$3 is coupled to the P/C 400$s$1 to 400$s$6 through gate valves s1$a$ to s1$f$, respectively. A bendable and revolvable arm S$a$ is provided at the transfer chamber T/C 400$t$3.

With this arrangement, the processing system 10 conveys the wafer W that has been transferred from the transfer system H to the process system S. The processing system 10 carries the wafer W into each of the P/C 400$s$1 to 400$s$6 through the T/C 400$t$3 using the arm S$a$ from a corresponding one of the LLMs 400$t$1 and 400$t$2. Then, the processing system 10 applies a process such as the etching process on the wafer W, carries the processed wafer W into the corresponding one of the LIMs 400$t$1 and 400$t$2 again through the transfer chamber T/C 400$t$3. The transfer arm H2$a$1 or H2$a$2 receives the processed wafer W and returns the received wafer W to a corresponding one of the cassette chambers H1$b$1 to H1$b$4.

In the processing system 10 as shown in each of FIGS. 13 and 14 as well, in which three or more PMs are present, log information generated in the respective devices of the processing system 10 and generated during communication between the respective devices when the desired process is applied to each wafer in each PM is stored in the log files according to type. Then, in response to a timing when the predetermined alarm has been generated, the log information stored in the respective log files is collectively saved in the backup files. This allows the log information before and after occurrence of a trouble to be obtained with reliability. Then, using the obtained log information, the cause of the trouble may be promptly investigated.

Respective control in the embodiment described above and association among the respective control will be briefly summarized below. The backup unit, for example, may back up the log information stored in the predetermined log file in response to the timing when a predetermined alarm has been generated in the processing system.

This ensures that the log information stored before and after occurrence of the predetermined alarm is backed up. With this arrangement, using the backed-up log information, the cause of the predetermined alarm may be investigated.

The predetermined alarm may include an unexpected alarm that is unlikely to be generated in view of a system configuration. The backup unit may collectively back up the log information stored in the predetermined log file, in response to the timing when the unexpected alarm has been generated. This makes it possible to identify why the unexpected alarm that is not likely to be generated in view of the system configuration has been generated, by using the backed-up log information.

The predetermined alarm may include an unexpected alarm that is unlikely to be generated in view of a system configuration. The backup unit may collectively back up log information stored in the predetermined log file, in response to the timing when the unexpected alarm has been generated in the processing system and the operation for the backup by the operator has been performed for the unexpected alarm.

With this arrangement, the log information is collectively backed up only after the unexpected alarm that is unlikely to be generated in view of the system configuration has been generated in the processing system and the operator has sent the signal that he or she desires to back up the log information. With this arrangement, unnecessary backup may be prevented by the instruction from the operator, and needless consumption of the storage area of the HDD may be prevented.

The predetermined alarm may be generated when alarm processing inserted into a program for controlling the processing system to investigate a trouble has been executed. With this arrangement, using the alarm inserted into the program for controlling the processing system to investigate the trouble as a trigger, the log information is collectively backed up. The backed-up log information may be thereby used for examining the trouble.

The predetermined alarm may be generated when alarm processing inserted into a portion of a program for controlling the processing system has been executed. The portion of the program is unlikely to be executed at a time of controlling the processing system using the program. This makes it possible to find out the reason why the processing step, which is unlikely to be executed during normal operation, has been executed, using the log information that has been backed up, triggered by the unexpected alarm.

The log information may include at least one of the log information on the overall system that has been generated in the processing system, alarm log information, communication log information on communication between the control device and external devices, and machine log information indicating a state of a drive of each device of the processing system. By respectively backing up the log information classified according to the purpose in response to the predetermined timing, the cause of an alarm may be investigated, using the log information of plural types.

The predetermined log file may be composed of first to fourth log files. The system log information may be stored in the first log file, the alarm log information may be stored in the second log file, the communication log information may be stored in the third log file, and the machine log information may be stored in the fourth log file. Then, the backup unit may collectively back up the log information stored in at least one of the first log file, second log file, third log file, and fourth log file to a corresponding backup file. By using the log information thus rearranged so as to facilitate verification of the system, the burden of investigating the cause of an alarm may be reduced.

The backup unit may back up additional information together with the log information collectively backed up.

The additional information may include information indicating at least one of an internal state of the program, internal states of a memory of the predetermined log file, and an internal state of the process having been executed by the processing system when the alarm has been generated.

With these arrangements, the cause of an alarm may be effectively found out using predetermined additional information as well as the log information indicating the predetermined events.

Each of the first to fourth log files may have the same size as each of the first to fourth backup files respectively corresponding to the first to fourth log files. Further, the first to fourth backup files may be stored in an area of a hard disk drive in which the first to fourth log files have been stored.

The backup unit may rearrange the collectively backed-up log information, using keywords extracted from the content of processing of the predetermined alarm. The log information thus rearranged so as to facilitate verification of the system may reduce the burden of investigating the cause of the alarm.

The capacity of the predetermined log file may be set to a capacity equivalent to the capacity of one arbitrary storage medium or a capacity capable of being transmitted by one e-mail, in order to transmit the backed-up log information to a log information user.

With this arrangement, the log information that has been collectively backed up when a predetermined alarm has been generated may be promptly and readily stored in a flexible disk, or may be transmitted to the person concerned (log information user), by being attached to the one e-mail.

The log management unit may overwrite an earliest stored one of the log information stored in the predetermined log file, by new log information. With this arrangement, the log information least likely to be used for verification of the system is updated by the newest log information.

The log information may include at least information on times when the predetermined events have occurred. Further, the log information may include information on the target object being processed at each of the times when the predetermined events have occurred.

This makes it easy to investigate when and what processing has been executed before and after the timing when an alarm has been generated.

The processing system may be the system of a cluster type including a plurality of processing chambers each of which applies the predetermined process on the target object, a target object accommodating portion that accommodates the target object, and a transfer mechanism which is disposed between the processing chambers and the target object accommodating portion and transfers the target object to a predetermined transfer destination. The processing system may be a system that processes a wafer or a substrate.

As described above, according to the present invention, the predetermined log information is collectively backed up at the predetermined timing. The log information that has been generated before and after the timing when a specific event has occurred may be thereby utilized for verification of the processing system, with reliability.

In the embodiment and the variations described above, operations of the respective portions are associated with one another and may be replaced with a sequence of operations, with the mutual association being taken into consideration. The embodiment of the control device of the processing system may be thereby regarded as an embodiment of a processing system control method. Further, by replacing the operations of the respective portions with processing of the respective portions, the embodiment of the processing system control method may be regarded as an embodiment of a process program for controlling the processing system. Further, by storing the process program for controlling the processing system in a storage medium capable of being read by a computer, the embodiment of the process program for controlling the processing system may be regarded as an embodiment of the storage medium capable of being read by the computer in which the process program is recorded.

It should be understood by those skilled in the art that various modifications, combinations, sub-combinations and alterations may occur depending on design requirements and other factors insofar as they are within the scope of the appended claims or the equivalents thereof.

The number of the processing chambers of the processing system according to the present invention, for example, may be set to be arbitrary. The target object to be used in the present invention is not limited to the silicon wafer, and may be a substrate made of quartz or glass, or the like.

As an example of a device that executes the desired process in each processing chamber, an etching device, a chemical vapor deposition (CVD) device, an ashing device, a sputtering device, a coater developer, a washing device, a chemical mechanical polishing (CMP) device, a physical vapor deposition (PDV) device, an exposure device, or an ion implanter may be pointed out. These devices may be embodied by a microwave plasma processing device, an inductive coupling plasma processing apparatus, and a capacitive coupling plasma processing apparatus.

The control device according to the present invention may be embodied by the EC 200 alone, or may be embodied by the EC 200 and the MCs 300.

What is claimed is:

1. A control method of a processing system that transfers a target object to a processing chamber and applies a predetermined process on the target object in the processing chamber, the control method comprising the steps of:
    storing predetermined events that have occurred in the processing system in a predetermined log file as log information;
    overwriting one of the stored log information by new log information when a free area of the predetermined log file is insufficient for storage of the new log information; and
    collectively backing up the log information stored in the predetermined log file in response to a timing when a specific one of the predetermined events has occurred,
    wherein the collectively backing up the log information includes backing up the log information stored in the predetermined log file in response to a timing when a predetermined alarm has been generated in the processing system,
    wherein the predetermined alarm is generated from a programmed alarm sequence included in a portion of a program for controlling processing of the target object in the processing system, and
    wherein the programmed alarm sequence triggers the predetermined alarm when a processing event associated with the processing of the target object in the processing system occurs that is inconsistent with a configuration of the processing system.

2. The control method according to claim 1, wherein the collectively backing up the log information includes backing up the log information stored in the predetermined log file in response to a timing when the predetermined alarm has been generated in the processing system and an operation for the backup has been performed by an operator for the predetermined alarm.

3. The control method according to claim 1, wherein the predetermined alarm is generated when an alarm sequence included in a program for controlling the processing system to investigate a problem with the processing system has been executed.

4. The control method according to claim 1, wherein the log information includes at least one of log information on the overall processing system that has been generated in the processing system, alarm log information, communication log information on communication between the control device and external devices, and machine log information indicating a driven state of each device configuring the processing system.

5. The control method according to claim 4, wherein
    the predetermined log file comprises first to fourth log files;
    the system log information is stored in the first log file, the alarm log information is stored in the second log file, the communication log information is stored in the third log file, and the machine log information is stored in the fourth log file; and
    the collectively backing up the log information includes backing up the log information stored in at least one of the first log file, the second log file, the third log file, and the fourth log file to a corresponding backup file.

6. The control method according to claim 5, wherein each of the first to fourth log files has the same size as each of first to fourth backup files respectively corresponding to the first to fourth log files.

7. The control method according to claim 6, wherein the first to fourth backup files are stored in an area of a hard disk drive in which the first to fourth log files have been stored.

8. The control method according to claim 1, wherein the collectively backing up the log information includes rearranging the collectively backed-up log information using keywords extracted during execution of the alarm sequence.

9. The control method according to claim 1, wherein the collectively backing up the log information includes backing up additional information together with the log information collectively backed up.

10. The control method according to claim 9, wherein the additional information includes information indicating at least one of an internal state of the program, internal states of a memory of the predetermined log file, and an internal state of the process having been executed by the processing system when the alarm has been generated.

11. The control method according to claim 1, wherein a capacity of the predetermined log file is set to a capacity equivalent to a capacity of one arbitrary storage medium or a capacity capable of being transmitted by one e-mail, in order to transmit the backed-up log information to a log information user.

12. The control method according to claim 1, wherein the storing predetermined events includes overwriting an earliest stored one of the log information stored in the predetermined log file, by Previously Presented log information.

13. The control method according to claim 1, wherein the log information includes at least information on times when the predetermined events have occurred.

14. The control method according to claim 13, wherein the log information includes information on the target object being processed at each of the times when the predetermined events have occurred.

15. A storage medium with a process program stored therein, the process program causing a computer to control a processing system that transfers a target object to a processing chamber and applies a predetermined process on the target object in the processing chamber, the process program comprising the processes of:
    storing predetermined events that have occurred in the processing system in a predetermined log file as log information;
    overwriting one of the stored log information by new log information when a free area of the predetermined log file is insufficient for storage of the new log information; and collectively backing up the log information stored in the predetermined log file in response to a timing when a specific one of the predetermined events has occurred, wherein the collectively backing up the log information includes backing up the log information stored in the predetermined log file in response to a timing when a predetermined alarm has been generated in the processing system, wherein the predetermined alarm is generated from a programmed alarm sequence included in a portion of a program for controlling processing of the target object in the processing system, and wherein the programmed alarm sequence triggers the predetermined alarm when processing event associated with the processing of the target object in the processing system occurs that is inconsistent with a configuration of the processing system.

16. The storage medium according to claim 15, wherein the collectively backing up the log information includes backing up the log information stored in the predetermined log file in response to a timing when the predetermined alarm has been generated in the processing system and an operation for the backup has been performed by an operator for the predetermined alarm.

17. The storage medium according to claim 15, wherein the predetermined alarm is generated when an alarm sequence included in a program for controlling the processing system to investigate a problem with the processing system has been executed.

18. The storage medium according to claim 15, wherein the log information includes at least one of log information on the overall processing system that has been generated in the processing system, alarm log information, communication log information on communication between the control device and external devices, and machine log information indicating a driven state of each device configuring the processing system.

19. The storage medium according to claim 18, wherein
the predetermined log file comprises first to fourth log files;
the system log information is stored in the first log file, the alarm log information is stored in the second log file, the communication log information is stored in the third log file, and the machine log information is stored in the fourth log file; and
the collectively backing up the log information includes backing up the log information stored in at least one of the first log file, the second log file, the third log file, and the fourth log file to a corresponding backup file.

20. The storage medium according to claim 19, wherein each of the first to fourth log files has the same size as each of first to fourth backup files respectively corresponding to the first to fourth log files.

\* \* \* \* \*